US012664185B2

(12) United States Patent
Das et al.

(10) Patent No.: US 12,664,185 B2
(45) Date of Patent: Jun. 23, 2026

(54) QUERY RESPONSE GENERATION

(71) Applicant: NVIDIA Corporation, Santa Clara, CA (US)

(72) Inventors: Shubhadeep Das, Pune (IN); Sumit Bhattacharya, Pune (IN); Ratin Kumar, Cupertino, CA (US)

(73) Assignee: NVIDIA Corporation, Santa Clara, CA (US)

( * ) Notice: Subject to any disclaimer, the term of this patent is extended or adjusted under 35 U.S.C. 154(b) by 693 days.

(21) Appl. No.: 17/674,704

(22) Filed: Feb. 17, 2022

(65) Prior Publication Data

US 2023/0259540 A1 Aug. 17, 2023

(51) Int. Cl.
| | |
|---|---|
| *G06F 16/3329* | (2025.01) |
| *G06F 16/334* | (2025.01) |
| *G06F 16/38* | (2019.01) |
| *G10L 13/08* | (2013.01) |
| *G10L 15/08* | (2006.01) |

(52) U.S. Cl.
CPC ...... *G06F 16/3329* (2019.01); *G06F 16/3344* (2019.01); *G06F 16/38* (2019.01); *G10L 13/08* (2013.01); *G10L 15/083* (2013.01)

(58) Field of Classification Search
CPC .. G06F 16/3329; G06F 16/38; G06F 16/3344; G10L 13/08; G10L 15/083
See application file for complete search history.

(56) References Cited

U.S. PATENT DOCUMENTS

| | | | |
|---|---|---|---|
| 8,429,099 B1 | 4/2013 | Perkowitz et al. | |
| 10,185,542 B2 * | 1/2019 | Carson | G06F 3/04842 |
| 10,418,032 B1 | 9/2019 | Mohajer et al. | |
| 10,664,049 B2 | 5/2020 | Kim et al. | |
| 10,692,244 B2 | 6/2020 | Gu et al. | |
| 10,930,272 B1 * | 2/2021 | Orkin | G06N 20/00 |
| 2016/0240095 A1 * | 8/2016 | Baughman | G09B 7/00 |
| 2018/0336464 A1 | 11/2018 | Karras et al. | |
| 2018/0341709 A1 * | 11/2018 | Saklatvala | G06F 16/245 |
| 2019/0042988 A1 | 2/2019 | Brown et al. | |
| 2019/0236136 A1 | 8/2019 | Sigal et al. | |
| 2019/0371314 A1 * | 12/2019 | Naughton | G06F 16/3329 |
| 2020/0051030 A1 | 2/2020 | Lebaredian et al. | |
| 2020/0380077 A1 * | 12/2020 | Ge | G10L 15/18 |

(Continued)

FOREIGN PATENT DOCUMENTS

| | | |
|---|---|---|
| CN | 113282734 A | 8/2021 |
| JP | 2018163525 A | 10/2018 |

(Continued)

OTHER PUBLICATIONS

"System and Methods for Advanced AI-Assisted Vehicles", U.S. Appl. No. 62/648,358, filed Mar. 26, 2018.

(Continued)

*Primary Examiner* — Bhavesh M Mehta
*Assistant Examiner* — Edward Tracy, Jr.
(74) *Attorney, Agent, or Firm* — IRON SUMMIT IP LLP

(57) ABSTRACT
In various examples, a conversational artificial intelligence (AI) platform uses structured data and unstructured data to generate responses to queries from users. In an example, if data for a response to a query is not stored in a structured data structured, the conversational AI platform searches for the data in an unstructured data structure.

20 Claims, 7 Drawing Sheets

(56) References Cited

U.S. PATENT DOCUMENTS

| | | | |
|---|---|---|---|
| 2021/0229601 A1 | 7/2021 | Hu et al. | |
| 2021/0347328 A1 | 11/2021 | Bhattacharya et al. | |
| 2022/0197933 A1* | 6/2022 | Boxwell | G06F 16/9538 |

FOREIGN PATENT DOCUMENTS

| | | |
|---|---|---|
| JP | 2019012439 A | 1/2019 |
| JP | 2020077159 A | 5/2020 |
| WO | 2021050284 | 3/2021 |

OTHER PUBLICATIONS

"Cloud-Centric Platform for Collaboration and Connectivity", U.S. Appl. No. 62/717,730, filed Aug. 10, 2018.

"System and Methods for Gaze, Body, and Gesture Recognition in Advanced AI-Assisted Vehicles," U.S. Appl. No. 62/742,923, filed Oct. 8, 2018.

"Managing Glare in Image Detection Using Artificial Intelligence", U.S. Appl. No. 16/363,648, filed Mar. 25, 2019.

"Real-Time Ray-Tracing Renderer", U.S. Appl. No. 62/879,901, filed Jul. 29, 2019.

"Gaze Determination Machine Learning System Having Adaptive Weighting of Inputs", U.S. Appl. No. 62/948,789, filed Dec. 16, 2019.

"Gaze Determination Using Glare as Input", U.S. Appl. No. 62/948,793, filed Dec. 16, 2019.

"Method and Apparatus for Gaze Determination and Applications Thereof", U.S. Appl. No. 62/948,796, filed Dec. 16, 2019.

"Generative Neural Network Assisted Video Compression and Decompression", U.S. Appl. No. 63/010,511, filed Apr. 15, 2020.

Das, Shubhadeep; First Office Action for Chinese Patent Application No. 202310097012x, filed Feb. 7, 2023, mailed Aug. 2, 2025, 14 pgs.

Das, Shubhadeep; First Office Action for Japanese Patent Application No. 2022-088245, filed May 31, 2022, mailed Oct. 31, 2025, 6 pgs.

Das, Shubhadeep; Second Office Action for Chinese Patent Application No. 202310097012x, filed Feb. 7, 2023, mailed Dec. 18, 2025, 16 pgs.

* cited by examiner

200

OBTAIN QUERY GENERATED BASED AT LEAST IN PART ON AUDIO DATA
202

DETERMINE QUERY DATA TO DISAMBIGUATE
204

DATA IN STRUCTURED MEMORY?
206

—Yes→ GENERATE RESPONSE BASED AT LEAST IN PART ON STRUCTURED MEMORY
208

No

DATA IN UNSTRUCTURED MEMORY?
210

—Yes→ GENERATE RESPONSE BASED AT LEAST IN PART ON UNSTRUCTURED MEMORY
212

No

GENERATE RESPONSE TO OBTAIN DATA
214

GENERATE AUDIO DATA CORRESPONDING TO RESPONSE BASED AT LEAST IN PART ON A TEXT-TO-SPEECH ALGORITHM
216

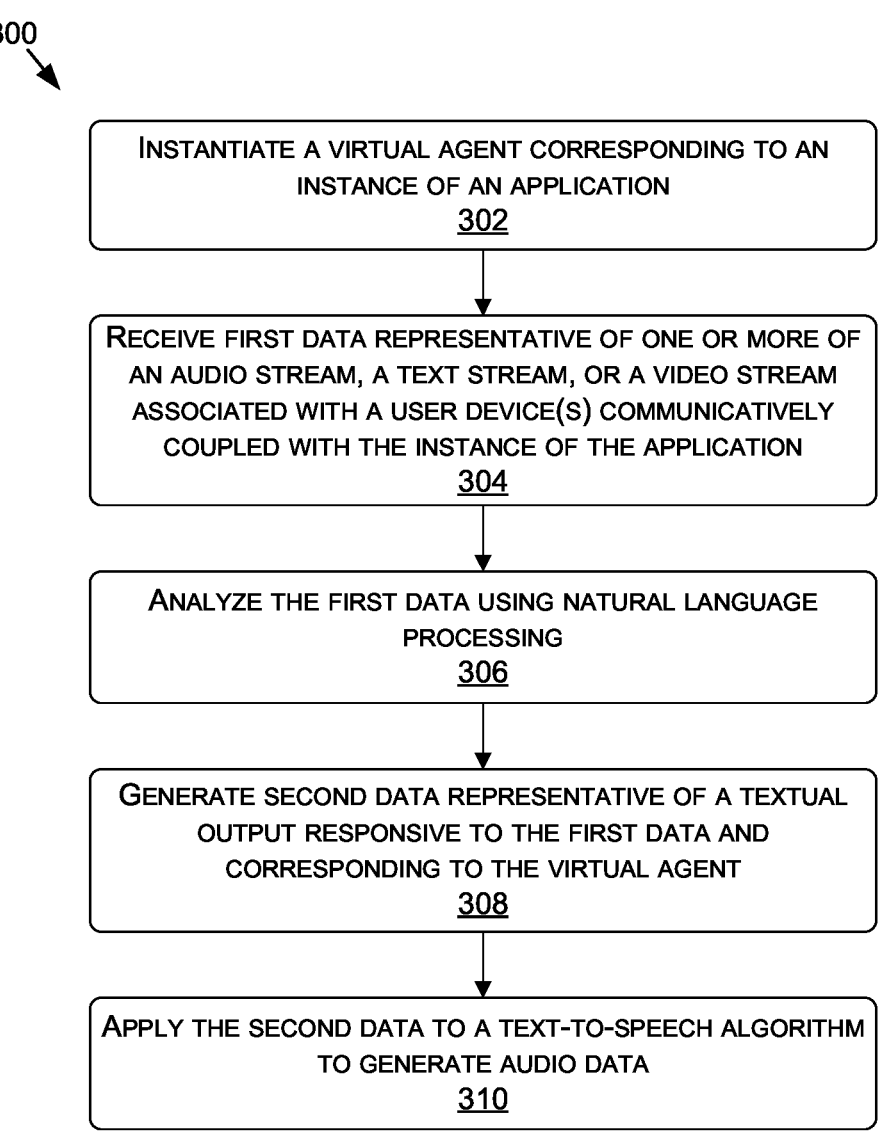

INSTANTIATE A VIRTUAL AGENT CORRESPONDING TO AN
INSTANCE OF AN APPLICATION
302

RECEIVE FIRST DATA REPRESENTATIVE OF ONE OR MORE OF
AN AUDIO STREAM, A TEXT STREAM, OR A VIDEO STREAM
ASSOCIATED WITH A USER DEVICE(S) COMMUNICATIVELY
COUPLED WITH THE INSTANCE OF THE APPLICATION
304

ANALYZE THE FIRST DATA USING NATURAL LANGUAGE
PROCESSING
306

GENERATE SECOND DATA REPRESENTATIVE OF A TEXTUAL
OUTPUT RESPONSIVE TO THE FIRST DATA AND
CORRESPONDING TO THE VIRTUAL AGENT
308

APPLY THE SECOND DATA TO A TEXT-TO-SPEECH ALGORITHM
TO GENERATE AUDIO DATA
310

MEMORY
604

I/O COMPONENTS
614

CPU(S)
606

POWER SUPPLY
616

GPU(S)
608

PRESENTATION
COMPONENT(S)
618

COMM. INTERFACE
610

LOGIC UNIT(S)
620

I/O PORT(S)
612

602

700

QUERY RESPONSE GENERATION

BACKGROUND

Conversational artificial intelligence (AI) assistants are used across various platforms for fulfilling verbal requests of users. For example, smart devices—such as phones, computers, tablets, displays, and speakers—may use AI assistants for interacting with a user's verbal requests for information (e.g., weather, news, financial information, etc.) and/or for activations of the smart device or a communicatively coupled device (e.g., playing a song, arming a security system, ordering an item, etc.). In addition, these AI assistants may display information responsive to the requests on a display—e.g., load a webpage, execute a graphical user interface of a music application, provide a visual indicator of a task being complete, display a requested video clip, show, or movie, etc. However, these traditional AI assistants have limited ability to build dialog memory, and are generally only capable of answering queries related to previously stored information. As a result, where certain information is missing (e.g., a name of a user's favorite restaurant, a home address, etc.), traditional AI assistants are not able to fill in this missing information, or reply effectively when prompted about this information. In addition, these traditional AI assistants are generally required to be programmed for each specific domain in which they are used, thus requiring separate, domain-specific information to be stored for each separate domain. As a result, even where information from one domain may be useful to another domain, traditional AI assistants often require entering or supplying the same information again for the other domain.

SUMMARY

Embodiments of the present disclosure relate to a conversational artificial intelligence (AI) platform with extractive question answering. Systems and methods are disclosed that include a conversational AI platform (e.g., including a virtual assistant) that maintains both structured and unstructured memory used to generate responses to queries (e.g., user queries). In an example, the conversational AI platform maintains unstructured data (e.g., a document or other unstructured data structure) including interactions with a particular user which can be used to generate responses to queries and/or generate data to be stored in the structured memory (e.g., short term memory or long term memory of the conversational AI platform). As a result, this unstructured data may be used to interact across various different domains, without requiring separate requests for the same information for each different domain.

In contrast to conventional systems, such as those described above, the conversational AI platform can generate responses to queries including undefined and/or unknown terms. In one example, a user asks (e.g., video, audio, text, and/or other input from a user input device) "what is the weather in my hometown," where the user's hometown is not defined (e.g., not stored in the structured data and/or not include in the set of defined key values pairs of the structured data) by the conversational AI platform. In such an example, a trained Question Answering (QnA) model performs a search of the unstructured data associated with the user to determine and/or extract the user's hometown. Based at least in part on a result of the search by the QnA model, for example, a response to the query is generated. Returning to the example above, where the unstructured data includes a record indicating that the user's hometown is "San Francisco," the conversational AI platform then replaces the "user's hometown" in the query with "San Francisco." As such, the audio, text, video, and/or other user input data received from users by a system executing the conversational AI platform is processed and used to render video, audio, and/or textual responses of an AI agent (e.g., a component of the conversational AI platform) that are then displayed or otherwise output by one or more devices (e.g., displays, speakers, etc.) associated with executing the conversational AI platform. Furthermore, in various embodiments, the user input data received from users and the responses generated by the conversational AI platform are maintained as unstructured data which is used by the QnA model to extract information used to generate response.

In various examples, this unstructured data includes a record of conversational history and/or a log of the interactions between users and the conversational AI platform and/or components thereof—such as the AI agent. The conversational AI platform, for example, maintains a separate unstructured data structure (e.g., a document) for various users containing queries, responses, and other data exchanged between the particular user and the conversational AI platform. As such, the unstructured data is generated over time based at least in part on interactions between users and the conversational AI platform. In addition, the conversation AI platform, in various examples, maintains structured data (e.g., short term memory or long term memory) including key value pairs for various defined slots. For example, the conversation AI platform may include the key "hometown" for which the value "San Francisco" is stored. In various examples, the value associated with a particular key is extracted from the unstructured data.

When a user presents a query to the conversational AI platform, for example, the conversational AI platform first searches the structured data (e.g., keyword search based at least in part on data extracted from the query) and then, if the search is unsuccessful (e.g., the structured data does not contain the corresponding key or does not contain a value corresponding to the key), searches the unstructured data. As opposed to the structured data which requires key value pairs to be defined, the unstructured data described in the present disclosure does not require defined data and therefore can provide greater flexibility and responsiveness to the conversational AI platform. In one example, the conversational AI platform does not include a defined key associated with a "favorite restaurant" but is still able to response to the query "make reservations at my favorite restaurant" based at least in part on the unstructured data including data indicating the user's favorite restaurant.

BRIEF DESCRIPTION OF THE DRAWINGS

The present systems and methods for conversational artificial intelligence (AI) platform with extractive question answering are described in detail below with reference to the attached drawing figures, wherein:

FIG. 2 is a block diagram of a method for generating a response based at least in part on unstructured memory of a conversational AI platform, in accordance with at least one embodiment of the present disclosure;

FIG. 3 is a block diagram of a method for generating a response to a query, in accordance with at least one embodiment of the present disclosure;

DETAILED DESCRIPTION

Figure 1:
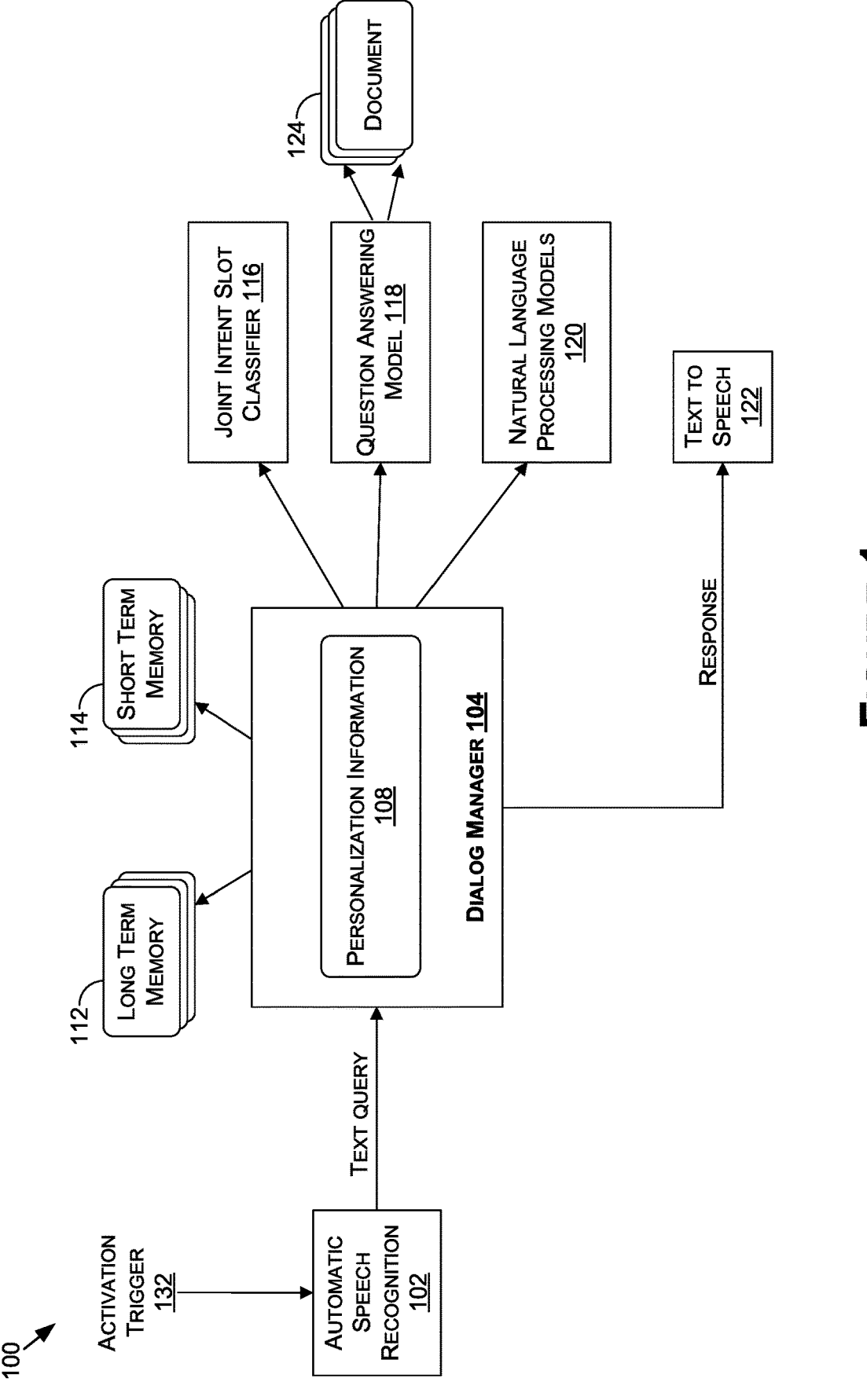
FIG. 1 is a block diagram of an example conversational AI platform, in accordance with at least one embodiment of the present disclosure.

Systems and methods are disclosed related to a conversational artificial intelligence (AI) platform with extractive question answering. In various embodiments, a conversational AI platform (e.g., virtual assistant, smart speaker, customer support application, etc.) maintains structured memory and unstructured memory to generate responses to queries. In an example, the conversational AI platform maintains unstructured data (e.g., a document or other unstructured data structure) including interactions with a particular user which can be used to generate response to queries and/or generate data for structured memory (e.g., short term memory). In such examples, the interactions with the user include textual data representing communication between the conversational AI platform and the user (e.g., "what is the weather right now in Los Angeles"; "the weather in Los Angeles is seventy two and sunny"). In an embodiment, the unstructured data includes a document containing a transcript and/or log of interactions (e.g., statements, queries, and responses) between the conversational AI platform and particular users.

In various embodiments, the structured memory maintained by the conversational AI platform include a set of defined key value pairs. In one example, the conversational AI platform maintains a data structure (e.g., a database stored as a JavaScript Object Notation (JSON) data object defining the key value pairs) including a set of slots and a trained classifier tags queries with intents and slots associated with queries to enable the conversational AI platform to respond to the query. In a specific example, the user provides a query "give me directions to home," and a Natural Language Processing (NLP) model tags an intent (e.g., retrieve data) and one or more slots associated with the query (e.g., place "home"), the conversational AI platform then retrieves data (e.g., an address associated with "home") from the structured data in order to generate a response to the query.

In various embodiments, an activation trigger is provided to the conversational AI platform and/or component thereof— such as an Automatic Speech Recognition (ASR) application— and the ASR application provides a textual representation of a query and user identification information to a dialog manager of the conversational AI platform. In various embodiments, the dialog manager maintains personalization data associated with a user, where the personalization data enables the conversational AI platform to generate responses to queries and support subsequent contextual queries. In addition, in an embodiment, the personalization data allows the conversational AI platform to extract data used in the responses from the unstructured data (e.g., the document containing user interaction history) using an extractive Question Answering (QnA) model based at least in part on a Natural Language Understanding model. In at least one example, the QnA model generates personalization data relative to a user which can be stored separate from one or more other users.

In an embodiment, user interacts with the conversational AI platform to store and retrieve information. For example, the user can instruct the conversational AI platform to store information (e.g., "remember I have a meeting tomorrow at noon"). In such examples, the dialog manager stores the information in unstructured memory for later retrieval. In various embodiments, if the user later provides a query for this information (e.g., "when do I have a meeting tomorrow?") the conversational AI platform labels the query (e.g., slot values based at least in part on the textual data representing the query) and searches the structured data based at least in part on the labels. If the search of the structured data fails, the QnA model may search the unstructured data associated with the user (e.g., based at least in part on a user identifier associated with the unstructured data). In various embodiments, the data extracted from the unstructured data is used to generate the response. Returning to the example above, the QnA model extracts "noon" as the meeting time from the unstructured data and the conversational AI platform includes the extracted value in the response and provides the response to a text-to-speech application, as described in greater detail below.

In various embodiments, if the QnA model is unable to extract data associated with the slot (e.g., the data requested in the query), the conversational AI platform may generate a query to the user for the unknown values (e.g., slot tags where values are undefined and/or not extracted from the unstructured data). For example, if the user asks "order food from my favorite restaurant" and the QnA model is unable to extract data associated with the slot "favorite restaurant," (e.g., no value is extracted from the unstructured data and/or the extracted value is associated with a confidence value below a threshold), the conversational AI platform may generate a response including a query to the user "what is your favorite restaurant?" In such an example, the conversational AI platform stores the user's response in the structure (e.g., if the slot is defined as a key value pair) and/or unstructured data. In this manner, the conversational AI platform, in various embodiments, uses unstructured data representing an interaction history to generate responses and disambiguate missing and/or undefined slot values related to other closed domain queries. For example, the QnA model can extract data from the unstructured data associated with a first domain (e.g., weather, home, food ordering) and use the extracted value for a second domain (e.g., navigation directions).

With reference to FIG. 1, FIG. 1 is an example a conversational AI platform 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the system 100 may include similar features, functionality, and/or components as example computing device 600 of FIG. 6 and/or example data center 700 of FIG. 7, described in more detail herein.

In various embodiments, an activation trigger 132 is obtained by a component of the conversational AI platform 100. The activation trigger 132, for example, may include a single action or a plurality of actions, such as a gesture, a trigger word and/or phrase, lip movement, staring at a camera, pass code, providing biometric data, and/or other action that can be captured by one or more sensors of a system executing the conversational AI platform 100 or component thereof—such as a host device 406 and/or 506 as described in greater detail below. In an embodiments, as a result of the conversational AI platform 100 detecting the activation triggers 132, automatic speech recognition (ASR) 102 may be triggered. In one example, a microphone connected to the conversational AI platform captures audio of one or more users in response to the activation trigger 132. In another example, the activation trigger 132 causes the conversational AI platform to obtain sensor data captured during an interval of time (e.g., before and/or after the activation trigger 132 is detected).

In various embodiments, the conversational AI platform 100 determines a particular user associated with the activation trigger 132 and/or sensor data associated with the activation trigger 132 (e.g., speaker identification, facial recognition, login credentials, etc.). In one example, video and/or audio data is used to determine user identification information (e.g., user ID) associated with the activation trigger 132 and/or query obtained from the user. In another example, the user provides login credentials or other identification information to the conversational AI platform prior to the conversational AI platform detecting the activation trigger. In yet other embodiments, a host device or other computing device detects the activation trigger 132 and provides sensor data to the conversational AI platform for ASR 102.

In various embodiments, the ASR 102 converts audio data to text for use by the conversational AI platform 100 and/or component thereof—such as a dialog manager 104. In an example, the ASR 102 may include software or other executable code that converts audio data into corresponding textual data or other data useable by the conversational AI platform 100. In various embodiments, the data obtained as a result of performing ASR 102 on the sensor data (e.g., the resulting text query) may be associated with the user identification information to allow the conversational AI platform 100 to use personalization information (e.g., document and/or other user data) associated with the user identification information. In an embodiment, the user identification information is determined based at least in part on computer vision, voice detection, user login information, etc., where the conversational AI platform 100 uses to user identification information to uniquely identify a particular user relative to one or more other users of the conversational AI platform 100. In various embodiments, the user identification information is associated with multiple structured data structures (e.g., long term memory 112 and/or short term memory 114) and/or multiple unstructured data structures (e.g., documents 124).

In various embodiments, the conversational AI platform 100 includes a dialog manager 104, personalization information 108, long term memory 112, short term memory 114, a joint intent slot classifier 116, question answering model (QnA) 118, documents 124, and natural language processing models 120. As described above, the components illustrated in FIG. 1, include source code or other executable logic that, as a result of being executed by one or more processors of a computer system (e.g., server computer), cause the computer system to perform the various operations described in the present disclosure. In one example, the dialog manager 104 obtains the text query and generates a response using one or more of the long term memory 112, short term memory 114, joint intent slot classifier 116, question answering model (QnA) 118, documents 124, and/or natural language processing models 120.

In various embodiments, the personalization information 108 allows the dialog manager 104 to determine whether the text query includes a personalization query or non-personalization query. In one example, the text query "set a timer for one minute" is considered a non-personalization query and the text query "what is the weather at home?" is considered a personalization query. In various embodiments, response to queries that include data from the long term memory 112, short term memory 114, and/or document 124 are personalization queries. In an embodiment, the joint intent slot classifier 116 classifies (e.g., tags) one or more slots included in the text query and, based at least in part on the classifications associated with the query, the dialog manager 104 determines whether the query is a personalization query. In one example, the joint intent slot classifier 116 includes a trained model to classify one or more components of a query—such as location, domain, components of speech, type of query, etc.

In an embodiment, if the text query includes a personalization query the dialog manager 104 searches the long term 112 and/or short term memory 114 based at least in part on the tagged slots (e.g., classification) from the joint intent slot classifier 116. In an example, the text query includes a query "what is the weather like at home?," where the joint intent slot classifier 116 has tagged the location "home" as unknown, the dialog manager 104 searches the long term memory 112 for the slot tagged as home. In such example, the long term memory 112 includes a key value pair where the slot (e.g., key) "home" is defined. In various embodiments, the long term memory 112 and short term memory 114 include data structures (e.g., JSON data objects) that include tags and/or keys and associated values. Returning to the example above, the key "home" may have a corresponding value "Santa Clara" within the long term memory 112. In various embodiments, if the key and/or value are not included in the long term memory 112 and/or short term memory 114, the dialog manager 104 causes the QnA model 118 to search the documents 124 for the unknown location/value (e.g., "home").

In an embodiment, the joint intent slot classifier 116 determines an intent of the text query. The text query, in an example, includes an intent to store data (e.g., "set a reminder for my meeting in Boston next week"). In such an example, the dialog manager 104 causes information in the text query to be stored in the document 124, the short term memory 114, and/or the long term memory 112, such that information in the text query can later be retrieved (e.g., "Boston" as the location of the meeting). In an embodiment, the dialog manager 104 may disambiguate one or more elements of the text query by at least obtaining data associated with the one or more elements from the document 124, the short term memory 114, and/or the long term memory 112. Returning to the example above, if the user later asks "where is my meeting next week?," the dialog manager 104 may determine—based at least in part on data obtained from the joint intent slot classifier 116 and the text query—to disambiguate the location of the meeting.

In various embodiment, the dialog manager 104 searches the long term memory 112 to disambiguate the text query (e.g., searches for the key "meeting location" for the value "Boston"). Furthermore, in such embodiments, if the search of the long term memory 112 does not return a result, the dialog manager 104 causes the QnA model 118 to search the documents 124. In an example, the QnA model 118 includes one or more models trained to search the documents 124 based at least in part on the text query. In various embodiments, the QnA model 118 performs closed-domain question answering and/or open-domain question answering. In addition, in various embodiments, data obtained from the documents 124 by the QnA model 118 can be used for searches across domains. In an example, the response to the query provided by the user represented by the text query "give me directions home" within a first domain (e.g., navigation) is generated by the dialog manager 104 based at least in part on data corresponding to "home" from a second domain (e.g., weather).

In embodiments where the search returns a result (e.g., data corresponding to the slot is obtained from the document 124, the short term memory 114, and/or the long term memory 112), the text query is modified and provided to the natural language processing (NLP) models 120. In one example, the text query "what is the weather in my hometown?" is modified to "what is the weather in Santa Clara?," where the value "Santa Clara" is obtained from the QnA model 118 as a result of searching one or more documents 124. In various embodiments, if the dialog manager 104 fails to obtain data associated with one or more slots identified by the joint intent slot classifier 116, the dialog manager 104 generates a response to obtain the data from the user. Returning to the example above, if the location "hometown" is not stored in a structured data structure (e.g., long term memory 112) or an unstructured data structure (e.g., the documents 124), the dialog managers generates a response to obtain a value associated with "hometown" (e.g., "what is your hometown?").

In various embodiments, the modified text query (e.g., when the data associated with a slot is obtained from structured data and/or unstructured data) is then provided to one or more NLP models 120 to generate the response. Furthermore, in various embodiments, the text queries and responses are stored in one or more documents 124. For example, queries obtained from a particular user and responses generated for the particular user are stored in a particular document associated with the user.

Now referring to FIGS. 2 and 3, each block of methods 200 and 300, described herein, comprises a computing process that may be performed using any combination of hardware, firmware, and/or software. For instance, various functions may be carried out by a processor executing instructions stored in memory. These methods may also be embodied as computer-usable instructions stored on computer storage media. The methods may be provided by a standalone application, a service or hosted service (standalone or in combination with another hosted service), or a plug-in to another product, to name a few. In addition, methods 200 and 300 are described, by way of example, with respect to the conversational AI platform 100 of FIG. 1. However, these methods may additionally or alternatively be executed by any one system, or any combination of systems, including, but not limited to, those described herein. Furthermore, the blocks of methods 200 and/or 300, in various embodiments, are executed in serial and/or parallel and block may be remove and/or additional steps or operations may be added to the methods 200 and 300.

FIG. 2 is a flow diagram showing a method 200 for generating a response to a query by a conversation AI platform, in accordance with some embodiments of the present disclosure. The method 200, at block B202, includes receiving a query generated based at least in part on one or more of an audio stream, a text stream, and/or a video stream associated with a user device(s) communicatively coupled with the instance of the conversation AI platform. For example, an audio, video, and/or textual stream generated using a user device(s) 404 is received—e.g., by the AI agent device(s) 402, as described in greater detail below in connection with FIGS. 4 and 5. In various embodiments, the query includes text generated by an ASR algorithm based at least in part on audio, video, and/or text captured or otherwise obtained from the user.

The system executing the method 200, at block 204, in an embodiment, determines one or more portions of the query to disambiguate. In one example, one or more terms of the text query are tagged as unknown (e.g., unknown location, unknown person, unknown object etc.) and the system executing the method 200 attempts to disambiguate the terms. For example, the text query "turn on my car," or "what is the weather outside?," include ambiguous terms "car" and "outside" for which the conversation AI platform disambiguates in order to generate a response to the query.

In an embodiment, at block 206, the system executing the method 200, determines whether data to disambiguate the term is stored in structured memory. In one example, the conversational AI platform causes a search of a structured data structure (e.g., JSON file, database, key value store, etc.) to be executed. In various embodiments, the search of the structured memory includes a key search. For example, the structured memory includes key values pairs, where the keys searched is obtained from the terms of the query to be disambiguated (e.g., the unknown object "car" or unknown location "outside").

In an embodiment, if the result of the search returns a value, the system executing the process 200 continues to block 208 and generates a response based at least in part on the data obtained from the structured memory. In an example, the term to be disambiguated is replaced with the value obtained from the structured memory and provide to one or more NLP models. Returning to the example above, the query "what is the weather outside?," is modified to replace "outside" based at least in part on a value obtained from the structured memory associated with "outside," (e.g., the location of the user).

In various embodiments, if a result is not obtained, a result is undefined, a confidence value associated with the result is below or above relative to a threshold, or the result is otherwise not suitable for use in modifying the query, the system executing the method 200 continues to block 210. At block 210, the system executing the method 200, causes a search of unstructured memory for data to disambiguate one or more terms of the query to be executed. In various embodiments, a trained QnA model performs a search of unstructured memory (e.g., an unstructured data structure—such as a document). In an embodiment, if the QnA model returns a response to the search query, the system executing the method 200, continues to block 212 and generates a response based at least in part on the result obtained from unstructured memory. In the example above, if the unstructured memory includes the user's location, the query "what is the weather outside?," is modified to replace "outside" based at least in part on a value obtained from the unstructured memory.

In various embodiments, if a result is not obtained, the result is undefined, a confidence value associated with the result is below or above relative to a threshold, or the result is otherwise not suitable for use in modifying the query, the system executing the method 200 continues to block 214 and generates a response to obtain the data. For example, if the query includes a location or event that is undefined in both the structure memory and unstructured memory, the system executing the method 200, generates a second query in response to the query to obtain the data. Specifically, returning to the example above, if the location "outside" is not obtained from a search of the structure memory and unstructured memory, the response generated by the system includes a second query to determine the location "outside" (e.g., "I am sorry, I don't know that information. What city are you in?").

In an embodiment, at block 216, the system executing the method 200, generates audio data corresponding to the response based at least in part on a text-to-speech algorithm. In an example, the response generated by the system (e.g., the response generated in one or more of blocks 208, 212, and/or 214) is provided to the text-to-speech algorithm to generate audio data or other data used in the response to the user.

FIG. 3 is a flow diagram showing a method 300 for instantiating an AI agent within an application, in accordance with some embodiments of the present disclosure. The method 300, at block B302, includes instantiating a virtual agent corresponding to an instance of an application. For example, the AI agent may be instantiated for communication within an instance of the client application 416. In another example, the AI agent is a component of the conversation AI platform.

The method 300, at block B304, includes receiving first data representative of one or more of an audio stream, a text stream, or a video stream associated with a user device(s) communicatively coupled with the instance of the application. For example, an audio, video, and/or textual stream generated using a user device(s) 404 may be received—e.g., by the AI agent device(s) 402.

The method 300, at block B306, includes analyzing the first data using natural language processing. For example, the received data may be analyzed by the AI engine 412 (executed by, for example and without limitation, one or more parallel processing units), which may include applying natural language processing to the data.

The method 300, at block B308, includes generating second data representative of a textual output responsive to the first data and corresponding to the virtual agent. For example, the AI engine 412 may generate text that corresponds to a verbal response of the AI agent. In various embodiment, the textual data includes a query as described above.

The method 300, at block B310, includes applying the second data to a text-to-speech algorithm to generate audio data. For example, the textual data corresponding to the response or communication of the AI agent may be applied to a text-to-speech algorithm to generate audio data.

Figure 4:
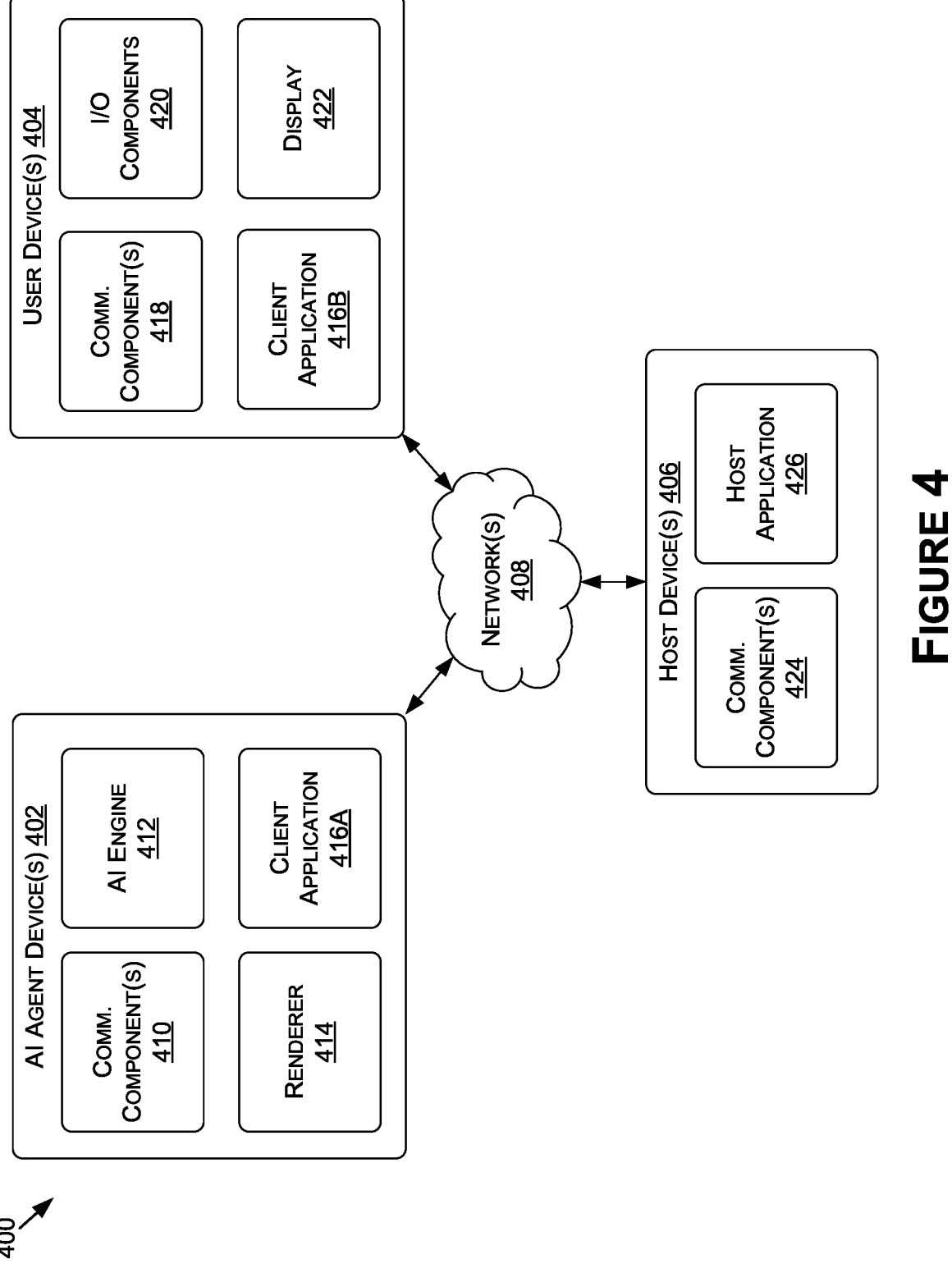
FIG. 4 is a block diagram of an example conversational AI platform, in accordance with at least one embodiment of the present disclosure.

With reference to FIG. 4, FIG. 4 is an example conversational AI platform 100 (alternatively referred to herein as "system 400"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, at least some of the features, functionality, and/or components described herein with respect to FIG. 4 may be implemented using one or more computing devices, such as an example computing device 600 of FIG. 6 and/or example data center 700 of FIG. 7, described in more detail herein. In other embodiments, at least some of the features, functionality, and/or components described herein with respect to FIG. 4 may be implemented using additional or alternative features, functionality, and/or components other than those described herein with respect to FIG. 4.

The system 400 may include, among other things, an AI device(s) 402, a user device(s) 404, and/or a host device(s) 406. Although only a single AI agent device(s) 402, a single user device(s) 404, and a single host device(s) 406 are illustrated in FIG. 4, this is not intended to be limiting, and any number of devices may be implemented within the system 400. In addition, although each of the AI agent device(s) 402, the user device(s) 404, and the host device(s) 406 are illustrated as separate devices from one another, this is not intended to be limiting. For example, depending on the embodiment, one or more of the devices may be combined into a single device (or set of devices, such as in a cloud computing environment). As a non-limiting example, in a conversation AI platform, the AI agent device(s) 402 may include one or more devices (e.g., servers in a cloud computing environment) that support the AI agent(s) communicating the user device(s) 404 which may include personal devices of users and the host device(s) 406 may include one or more devices (e.g., servers in a cloud computing environment) that host the conversational AI platform (e.g., using a host application 426 including one or more application programming interfaces (APIs)). As another non-limiting example, in an automotive application, the AI agent device(s) 402, the user device(s) 404, and the host device(s) 406 may include a single device (e.g., a supercomputer within the vehicle), or may include a combination of a vehicle-located device (e.g., the supercomputer) and a remotely located device (e.g., one or more servers in a cloud computing environment) that communicate with the vehicle-located device for updates, responses to more complex tasks, etc. As such, the AI agent device(s) 402, the user device(s) 404, and the host device(s) 406 may be owned, operated, and/or supported by a same user or company, different users or companies, and/or a combination thereof.

The AI agent device(s) 402 may include a server, a network attached storage (NAS), an API, a backend device, and/or another type of device. The AI agent device(s) 402 may support the functionality of the conversational AI platform—such as those described herein. As such, in some embodiments, some or all of the components, features, and/or functionality of the AI agent device(s) 402 may be executed locally on user device(s) 404. For example, certain tasks, requests, interactions, and/or conversations between a user and the AI agent on the user device(s) 404 may be handled locally on the user device(s) 404. In embodiments, some or all of the components, features, and/or functionality of the AI agent may be executed by the AI agent device(s) 402 remotely with respect to the user device(s) 404 and/or the host device(s) 406. For example, data from the user device(s) 404 and/or the host device(s) 406 may be received and processed using the AI agent device(s) 402, and a video stream, and audio stream, and/or a textual stream of the response or communication by the AI agent may be transmitted to the user device(s) 404 and/or the host device(s) 406.

The user device(s) 404 may include a smartphone, a laptop computer, a tablet computer, a desktop computer, a wearable device, a game console, a smart-home device that may include an AI agent or assistant, and/or another type of device. In some examples, the user device(s) 404 may include a combination of devices (e.g., a smartphone and a communicatively coupled smart watch or other wearable device), and the applications associated therewith, including interactions with the application, may be executed using one or more of the devices (e.g., smartphone application pushes notification to smartwatch application, user provides input to smartwatch, data representative of input is passed to another device of the system 400 via the smartphone).

The host device(s) 406 may include a server, a network attached storage (NAS), an API, a backend device, a device similar to the user device(s) 404 described herein, and/or another type of device. The host device(s) 406 may support the functionality of a host application 426 by which interactions between the AI agent and one or more end users— e.g., via the user device(s) 404—are communicated. For example, in a conversation AI platform, the host device(s) 406 may host the conference system, and the AI agent device(s) 402 may support an AI agent(s) as a participant(s) in a particular conference while the user device(s) 404 may support a user(s) as another participant(s) in the conference. As another example, in a fast-food ordering application, the host application 426 may include an interactive menu in which an AI agent aids a user in navigating the menu for selecting one or more items. According to such embodiments, the host device(s) 406 may be positioned locally at (proximately to) the restaurant, and may be implemented as, for example and without limitation, a computing device communicatively coupled to I/O components 420 of an ordering apparatus or kiosk. The AI agent device(s) 402 may be located remotely (and/or locally), and used for processing data generated based on user input (e.g., voice, text, video, etc.) and generating a response or interactions by the AI agent. According to one or more embodiments, the user device(s) 404 may not be required; alternatively, the user device(s) 404 may be a device of a user for interacting with the host device(s) 106 (e.g., providing touch inputs to a client application 516B associated with the host device(s) 506).

The AI agent device(s) 402, the user device(s) 404, the host device(s) 406, and/or other components of the system 400 may communicate over network(s) 408. The network(s) may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. In some embodiments, AI agent device(s) 402, the user device(s) 404, and/or the host device(s) 406 may communicate over a WAN (e.g., the Internet) via a LAN (e.g., Wi-Fi, Ethernet, etc.) and/or a cellular network (e.g., 4G, LTE, 5G, etc.)— e.g., where the system 400 is implemented in a cloud-based or distributed computing environment.

The communication component(s) 410, 418, and/or 424 may include one or more components, features, and/or functionality for communicating across one or more of the networks 408, such as but not limited to those described herein. As a non-limiting example, the user device(s) 404 may use an Ethernet and/or Wi-Fi connection through a router, or a cellular connection through one or more cell towers, to access the Internet in order to communicate with the AI agent device(s) 402 and/or the host device(s) 406. The AI agent device(s) 402 and/or the host device(s) 406—e.g., when corresponding to servers or other computing devices in a cloud-based data center—may access the Internet over Ethernet. As such, the communication component(s) 410, 418, and/or 424 may be configured for communication over one or more network types, and may allow communication between and among the various devices of the system 400 over one or more network types. Client application 416A, client application 416B, and host application 426 may correspond to different instances of an associated application.

The AI agent device(s) 402 may leverage any number of parallel processing units for analyzing incoming data, processing the data, and determining output data—e.g., text-to-speech audio data and corresponding changes to the AI agent within a virtual environment—that may be rendered and transmitted (e.g., via a video stream, a textual stream, and/or an audio stream) to one or more user device(s) 404 for display and/or output. Suitable parallel processing units may include one or more graphics processing units (GPUs) in a GPU-accelerated AI environment. The GPUs may be leveraged by the AI engine 412 and/or the renderer 414, as described herein, and/or by other components of the system 400. In addition, in some embodiments, the AI agent device(s) 402—and/or other devices—may leverage video compression techniques for optimizing the transmission of video data. In one or more embodiments, suitable video compression techniques may include compression techniques optimized for conversational AI platform. Such techniques include some or all of the components, features, and/or functionality as described in U.S. Provisional Patent Application No. 63/010,511, filed on Apr. 15, 2020, which is hereby incorporated by reference in its entirety.

The AI engine 412 of the AI agent device(s) 402 may process incoming textual, audio, and/or image data (e.g., multimodal data) to determine what is being communicated textually, audibly, and/or visually, and to determine whether a response or output is necessary by the AI agent, what response should be output where an output is determined, and/or how to output the response (e.g., to determine a tone, emotion, gesture, animation, etc. of the AI agent). In some embodiments, the AI engine 412 may correspond to or be similar to the JARVIS AI platform from NVIDIA Corporation, and/or may include some or all of the components, features, and/or functionality as described in U.S. patent application Ser. No. 15/809,849, filed on Nov. 10, 2017; U.S. patent application Ser. No. 16/137,064, filed on Sep. 20, 2018; U.S. Provisional Patent Application No. 62/648,358, filed on Mar. 26, 2018; U.S. Provisional Patent Application No. 62/742,923, filed on Oct. 8, 2018; U.S. patent application Ser. No. 16/363,648, filed on Mar. 25, 2019; U.S. patent application Ser. No. 16/773,883, filed on Jan. 27, 2020; U.S. Provisional Patent Application No. 62/948,789, filed on Dec. 16, 2019; U.S. Provisional Patent Application No. 62/948,793, filed on Dec. 16, 2019; U.S. Provisional Patent Application No. 62/948,796, filed on Dec. 16, 2019; U.S. patent application Ser. No. 16/859, filed on Apr. 27, 2020; and/or U.S. patent application Ser. No. 16/867,395, filed on May 5, 2020, each of which is hereby incorporated by reference in its entirety.

The AI engine 412 may use visual cues such as gestures and gaze along with speech in context to determine responses or communications—e.g., visual, audible, mechanical (via a user input device) or textual—within an application. For example, the AI engine 412 may use lip position and motion fused with speech input to identify an active speaker, and gaze may be used to understand if the speaker is engaging the AI agent, other people in the same location as the user, or others participating in an instance of the application. This combination of gaze and lip movement may correspond to an activation trigger, as described in more detail herein. The ability of the AI engine to fuse multimodal data allows simultaneous multi-user, multi-context conversations with the AI agent—e.g., conversations that benefit from a deeper understanding of context than traditional, strictly-verbal communication with AI assistants.

For example, the AI engine 412 may include any number of features for speech tasks such as intent and entity classification, sentiment analysis, dialog modeling, domain and fulfillment mapping, etc. In some embodiments, the AI engine 412 may use natural language processing (NLP) techniques or one or more neural network model to ingest, decipher, perceive, and/or make sense of incoming audio data. For vision, the AI engine 412 may include any number of features for person, face, and/or body (gesture) detection and tracking, detection of key body or facial landmarks and body pose, gestures, lip activity, gaze, and/or other features. The AI engine 412 may further include fused sensory perception, tasks, or algorithms that analyze both audio and images together to make determinations. In embodiments, some or all of the speech, vision, and/or fused tasks may leverage machine learning and/or deep learning models (e.g., NVIDIA's Jarvis and Natural Language Processing Models), that may be trained on custom data to achieve high accuracy for the particular use case or embodiment. The AI agent as managed by the AI engine 412 may be deployed within a cloud-based environment, in a data center, and/or at the edge.

In some embodiments, the AI agent device(s) 402 may generate and render the AI agent—e.g., using the renderer 414—even where communication by the AI agent is not occurring. For example, the renderer 414 may still render image or graphical data corresponding to the virtual AI agent within a virtual environment during an application session even where the AI agent is not currently speaking, moving, or otherwise interacting in response to or based on inputs from a user. In this way, the end-user may still see a display or presentation of the AI agent—and corresponding virtual environment—and understand that the AI agent is available for interaction. In other embodiments, the AI agent may only be displayed or presented when actively speaking, replying, and/or after an activation trigger is satisfied.

The AI engine 412 may, in some embodiments, only process the incoming data for identifying an activation trigger for the AI agent before more heavily processing the incoming data. For example, and to comply with and be respectful of privacy concerns, laws, and/or regulations, an activation trigger may be monitored for by the AI engine before user input (such as speech) is cached (or otherwise stored) and actively processed. The activation trigger may be different depending on particular embodiments, environments, or locations of the AI agent—or the user device(s) 404—the type of I/O component(s) 420 available to the user device(s) 404 (e.g., where no camera is present, the activation trigger may be audible only). In some embodiments, the activation trigger may include more than a single trigger (e.g., activation requires multimodal triggering) to ensure that privacy concerns are respected, to allow the AI engine 412 to more accurately identify the current speaker for properly responding to any inquiry or conversation, and/or to allow for more conversational context or indicia (e.g., looking at a camera and speaking to activate during conversation is more natural than stopping conversation to speak a specific triggering word or phrase). For example, the activation trigger may include analyzing image data (e.g., streaming video) to determine that a user is looking at the camera (e.g., gaze tracking) and that the user is speaking (e.g., by tracking lip movement). Another activation trigger may include determining that a user is speaking and determining a gesture of the user (e.g., activation may occur when speech is heard and a triggering gesture, such as a wave of the hand, is identified). In some embodiments, such as in an environment where speech—or loud speech—is not allowed (e.g., a library, a religious building, etc.) or a user is incapable of speech, the activation trigger may include a movement or gesture, and/or an input to a device (e.g., a button, a lever, a touch interface, etc.). However, in other embodiments, the activation trigger may include a single non-verbal activation, such as a gesture, a trigger word, lip movement, staring at the camera, etc. In some embodiments, such as where privacy concerns are not an issue or a user has opted in to constant recording of audio and/or video, no trigger activation may be used—although the audio, text, and/or video may still be monitored to determine when a user is addressing the AI agent.

In certain countries, regions, or jurisdictions, the laws, rules, regulations, and/or privacy concerns may not allow for constant recording of audio or speech in public spaces, so the activation triggers may be entirely vision based—e.g., using a rolling buffer. The laws, rules, regulations, and/or privacy concerns of certain countries, regions, or jurisdictions may not allow for constant recording of video and/or audio on private property, but may allow for recording a rolling buffer of video and/or audio, and processing that rolling buffer to determine whether an activation trigger is present. In any embodiment, once an activation trigger is satisfied, the microphones, cameras, and/or other I/O component(s) 420 may be opened up (e.g., activated to listen, monitor, or observe for user input beyond triggering events), and the data may be processed by the AI engine 412 to determine a response and/or other communication. The data may be processed indefinitely, only during a single back and forth communication that requires another trigger to continue the processing, until a deactivation trigger is satisfied (e.g., a trigger word, such as stop, hold on, etc., a trigger gesture, a lack of speech, movement, looking at the camera, or other interactions within a threshold period of perceived inactivity, etc.

The incoming data—e.g., visual, textual, audible, etc.—may be analyzed by the AI engine 412 to determine a textual, visual, and/or audible response or communication—represented using three-dimensional (3D) graphics—for the AI agent. For example, the AI engine 412 may generate output text for text-to-speech processing—e.g., using one or more machine learning or deep learning models—to generate audio data. This audio data may be transmitted to the user device(s) 404—via the host device(s) 406, in embodiments—for output by a speaker or another I/O component(s) 420 of the user device(s) 404. In some embodiments, the audio data may be used to influence the behavior of the AI agent within a virtual environment. For example, the audio data may be used to allow the AI agent to lip synchronize with the audio such that speech of the AI agent appears to emanate from the AI agent naturally, to resemble interpersonal conversation. This may be completed using audio-to-face algorithms or lip-syncing algorithms, that may include machine learning or deep learning models that may drive a 3D graphical facial animation corresponding to the audio output by the AI agent. Suitable audio-to-face algorithms may include some or all of the components, features, and/or functionality as described in U.S. patent application Ser. No. 15/826,430, filed on Nov. 29, 2017, which is hereby incorporated by reference in its entirety.

As such, the AI agent's lips may be controlled with the virtual environment to correspond to the audio data—or at least the portions of the audio representing speech. In addition to the speech, there may be additional audio data corresponding to background noises or sounds, music, tones, ambient noises, other AI agents, virtual bots, and/or other sources. Ultimately, the audio data including the speech of the AI agent and other audio sources may be transmitted—e.g., as an audio stream—to the user device(s) 404 (e.g., via the host device(s) 406, in embodiments).

In addition to audio, a response or communication by an AI agent may include simulated physical movements, gestures, postures, poses, and/or the like that may be represented in the virtual world. The appearance, gestures, movements, posture, and/or other information corresponding to the AI agent—in addition to the virtual environment in which the AI agent is located—may be represented by graphical data. This graphical data may be rendered by the renderer 414 to generate display data or image data that may be streamed to the user device(s) 404 for presentation on a display 422.

The AI engine 412 may determine the simulated physical characteristics of the AI agent based on an analysis of the incoming data, the general type or personality of the AI agent, and/or the determined textual, audible, and/or visual response or communication by the AI agent. For example, where the AI engine 412 determines that a current speaker is angry or sad, this information may be leveraged to simulate the AI agent to respond appropriately (e.g., using a gentle, uplifting, or consoling tone or phrasing). Where the AI engine 412 determines that a certain gesture or posture is fitting to the spoken response of the AI agent, the AI agent may be controlled as such within the virtual environment. As such, a body and/or face of the AI agent may be animated such that the AI agent may emote (express its own set of emotions) for the virtual camera.

Similar to the AI agent, the virtual environment in which the AI agent is located may be generated to aid in the response. For example, where a request for weather in a particular real-world vicinity is received, and the weather is raining, a virtual representation of the location, with cloudy skies and rain falling, may be generated and the AI agent may be made to appear glum (e.g., slouched, with a sad face). Similarly, where a certain song is requested, the AI agent may move or gyrate to the beat of the song and sing the song—e.g., with lip syncing. In some examples, the virtual environment may be updated throughout a single instance of an application or during a single inquiry-response communication. For example, to provide additional context, the virtual environment may be changed to reflect new locations such that the AI agent may appear, in essence, to teleport from one virtual location to another. In some embodiments, where the discussion is better suited for a different domain, in addition to the environment or location changing, the particular AI agent may also change. For example, where a user is asking for information about weather in the city of London, a weather-based AI agent may be represented within a rendered virtual environment corresponding to a skyline of London, and when the user asks a follow up question about the history of London, a history-focused AI agent may be represented within or proximate to a photograph or rendered image of a historical building in London.

In some embodiments, the virtual environment may include a presentation of text, or a document. For example, where a user interacts with an AI agent associated with a bank or other financial institution, the virtual environment may include the AI agent standing in front of or holding a graphical rendering of a bank statement that corresponds to information requested by the user. In such an example, the communication between the user and the AI agent may be more secure as the bank information is not transmitted in an indexable form, and is less structured than, for example, an email with a bank statement. As such, the visual, audible, and/or textual response from the AI agent device(s) 402 may be more secure and private than an email, SMS, or text message communication of the same information.

In some embodiments, the AI agent may interact with objects, features, or items in the virtual environment to aid in the response or interaction with a user. For example, to provide a demonstration to aid in an interaction, the AI agent may virtually interact with the environment. Where an application is being used to discuss an architectural plan, a computer aided design (CAD) application file may be accessed and used to generate a rendering of the virtual environment. For example, the architectural plan may be instantiated within the virtual environment of the AI agent such that the AI agent may interact with the plan or portions/elements of the plan. This may include pointing to features of or moving around within or with respect to the architectural plan. Where the incoming data includes a request to modify a portion of the plan, the AI agent may perform a gesture and the architectural plan may be modified according to the request. For example, where a window is mentioned, without some visual cue, the location of the window and the discussion around the window may be less informative. However, using the AI engine 412, the view of the virtual environment—e.g., from a virtual field of view of a virtual camera—may be updated to include the window of discussion. In addition, the AI agent may point to or otherwise indicate the window that is being talked about, and the system 400 may make updates to the window through communication with the CAD application, which may be fed back to the system 400 for updating the virtual environment based on the updated CAD file.

In some embodiments, in addition to analyzing the incoming textual, visual, user input, and/or audio data from users, user profiles or user information of the users may be accessed to determine textual, audible, and/or visual responses by the AI agent. For example, where a user asks what the weather is, the location information of the user may be leveraged to determine a proper response to the particular location. In such an example, the virtual environment may also be updated to reflect the location—e.g., to include a portion of the location, or an identifying feature of the location, such as the Eiffel Tower in Paris. Similarly, user preferences or other information may be leveraged to appropriately respond to or interact with users. In some embodiments, this information may be gleaned during the instance of an application—e.g., during a video conference—based on user speech, movements, etc. For example, when a user mentions they are at their house in New York City, this information may be stored, such that when the user later asks, "how is the traffic at home?," the response can be based on the already-known location information.

Personalized models may be generated for different users over time, such that the AI engine 412 may learn what a particular user looks like when they are happy, sad, etc., and/or to learn a particular users speech patterns, figures of speech, and/or other user-specific information that may be used to tailor the AI engine 412 to the particular user. This information may be stored in a user profile of the AI agent device(s) 402. Similarly, by studying any number of users, the AI engine 412 and the renderer 414—and/or the underlying machine learning or deep learning models associated therewith—may learn how to effectively emote and/or animate a 3D graphical rendering of the AI agents in the virtual environments such that the AI agents may communicate and appear more human-like. Along the same lines, where the AI agent is to resemble an (anthropomorphic) animal, a robot, an object, etc., the AI engine 412 may learn from data corresponding to the real-world versions of the AI agent in order to more accurately simulate the animal, robot, object, vehicle, etc. in the virtual environment.

The AI engine 412 may support any number of AI agents. For example, different AI agents may be programmed for different domains or skills. As such, a user may request a specific AI agent, or a particular AI agent may be selected by the AI engine 412 based on the incoming data (e.g., where a request is for weather, a weather AI agent may be instantiated, where a request is for finance, a financial AI agent may be instantiated, where a request is for a purchase, a shopping assistant AI may be generated, etc.). As a result of the AI agent corresponding to a particular domain(s), communications between users and the AI agent may be more successful as the requests, commands, questions, inquiries, etc., are more likely to be routed to the proper response or conversational logic and tools for that domain.

The renderer 414 may render display data or image data from the graphical data and/or using one or more models of a virtual environment or world (e.g., data representing the virtual environment or world including a virtual AI agent) for transmission to and/or presentation by the user device(s) 404. In some embodiments, the image data or display data may be rendered to represent a subset of graphical data corresponding to a portion of the virtual environment as captured from a virtual field of view of a virtual camera. In addition, the audio data may be transmitted to and/or output by the user device(s) 404. Further, textual data from the AI agent may be transmitted to and/or displayed by the user device(s) 404. As such, communications—e.g., of textual, visual, and/or audible data—may be exchanged between the client application 416A and the client application 416B, via the host application 426, in embodiments. The display data, image data, textual data, and/or audio data may be transmitted as a stream(s) of data during an instance of the application—e.g., the client application 416A, 416B and the host application 426.

In some embodiments, the renderer 414 may correspond to or be similar to Omniverse Kit from NVIDIA Corporation and/or may be include some or all of the components, features, and/or functionality as described in U.S. Provisional Patent Application No. 62/717,730, filed on Aug. 10, 2018; U.S. patent application Ser. No. 16,538,594, filed on Aug. 12, 2019; U.S. patent application Ser. No. 16,538,594, filed on Mar. 22, 2020; and/or U.S. Provisional Patent Application No. 62/879,901, filed on Jul. 29, 2019, each of which is hereby incorporated by reference in its entirety. For example, the renderer 414 may correspond to an NVIDIA RTX RENDERER.

The renderer 414 may leverage any number of GPUs—and/or nodes thereof—for rendering the display data or image data from the graphical data. For example, ray tracing—e.g., real time ray tracing—and/or path tracing may be executed using one or more GPUs to generate more photo-realistic renderings. The renderer 414 may, in some non-limiting embodiments, use PIXAR'S Universal Scene Description (USD) format and/or another 3D scene description and file format for content creation and interchange between and among various different tools. Once rendered, the graphical and/or audio output may be compressed/encoded before being transmitted to a computing device corresponding to users or participants interacting with the AI agent where the compressed or encoded data is decompressed (decoded) before presentation.

With respect to the user device(s) 404, the input/output (I/O) component(s) 420 may include any type of devices capable of providing inputs, receiving inputs, and/or generating outputs. For example, the input device(s) of the I/O device(s) 420 may include, without limitation, a keyboard, a mouse, a touch-screen display, a controller(s), a remote(s), a headset, a stylus, a microphone, a camera, and/or other types of input devices. The output device(s) of the I/O component(s) 420 may include, without limitation, a speaker, a display, a light source, a haptic feedback device (e.g., a vibration motor), and/or other types of output devices. In some embodiments, as described herein, the AI agent device(s) 402 may leverage virtual or simulated I/O components—similar to the I/O component(s) 420 of the user device(s) 404—to communicate within the system 400. For a non-limiting example, communications from the AI agent may be captured from a virtual field of view of a virtual camera in a virtual environment and/or from a virtual audio sensor of a virtual microphone (or a virtual audio cable connected thereto) in a virtual environment. As such, the AI agent device(s) 402—e.g., using the renderer 414 and/or the AI engine 412—may capture data from within the virtual environment and/or corresponding to the AI agent using one or more virtual I/O components.

Figure 5:
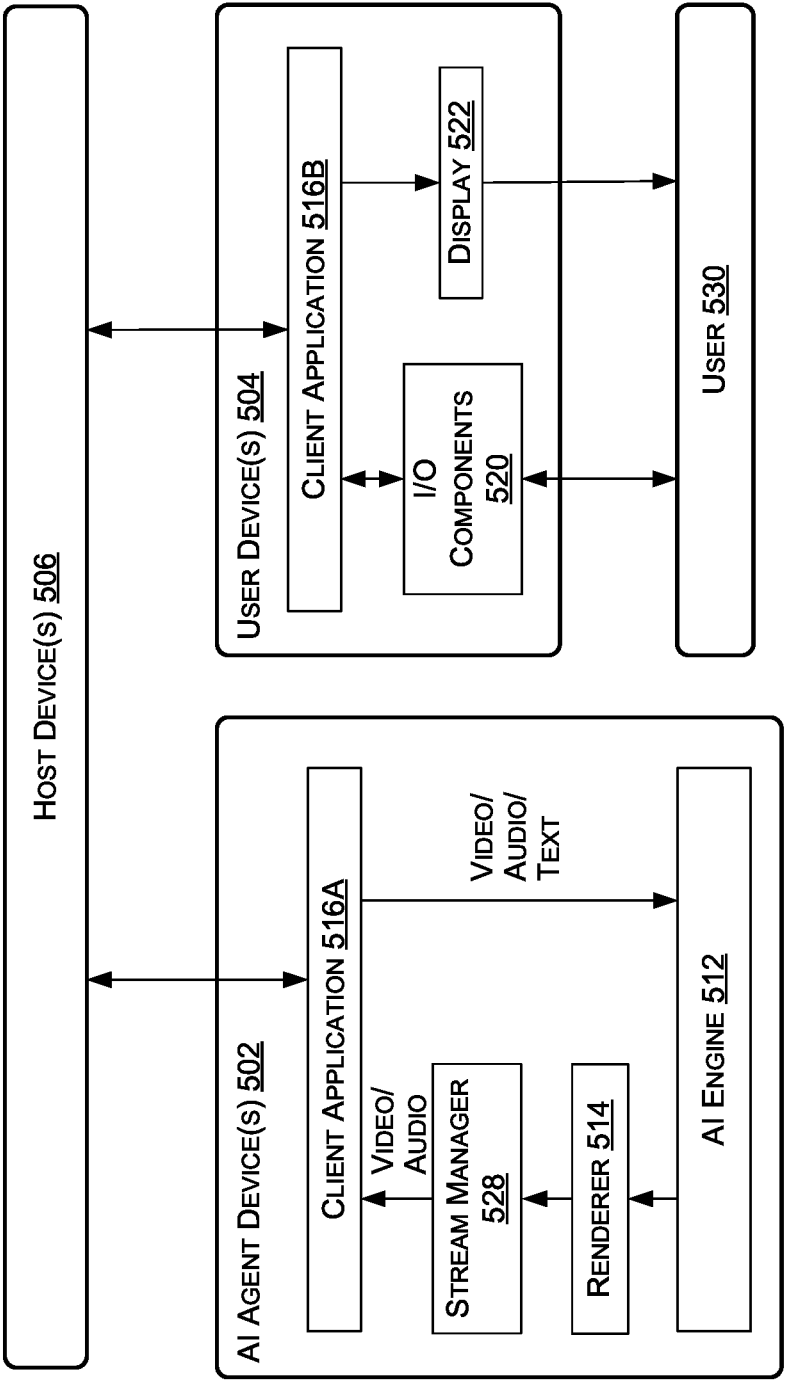
FIG. 5 is a block diagram of an example conversational AI platform, in accordance with at least one embodiment of the present disclosure.

Now referring to FIG. 5, the conversational AI platform 500 may be used to allow an AI agent via the AI agent device(s) 502 to response to queries from one or more users via the user device(s) 504. In such an example, the client application 516A and 516B may correspond to end-user application versions of the conversational AI platform and the host device(s) 506 may include the host application 526 hosting the AI agent.

For each user device 504, a user(s) 530 may provide inputs to one or more I/O components 520 and/or the I/O components 520 may generate data. For example, a camera—e.g., a web cam—may capture a video stream of its field of view (which may include the user), a microphone may capture an audio stream, and/or a keyboard, mouse, or other input devices may capture a textual stream or other input streams. In some embodiments, during some or all of the instance of the application, the AI agent and/or a virtual environment thereof may be presented on the display 522 based on received display data or image data corresponding to a rendering of graphical data representative of the virtual environment.

These streams of audio, video, and/or textual data may be received by the client application 516B and transmitted—e.g., after encoding—to the host device(s) 506, and the host device(s) 506 may analyze, process, transmit, and/or forward the data to the client application 516A of the AI agent device(s) 502. The AI engine 512 may access and/or receive the video, audio, and/or textual streams from the client application 516A and may process the data to determine a response or communication for the AI agent and/or the renderer 514 may generate any update(s) to the corresponding virtual environment. In some embodiments, notes, question and answer dialogue box information, and/or other information associated with the conversation AI platform may be received and processed by the AI engine 512. As such, once the textual, visual, and/or audible response or communication of the AI agent is determined, the AI agent and the virtual environment may be updated according thereto, and display data and/or image data generated from the graphical data—e.g., from a virtual field of view or one or more virtual sensors, such as cameras, microphones, etc.—may be rendered using the renderer 514. A stream manager 528 may receive the rendered data and generate a video stream, an audio stream, a textual stream, and/or encoded representations thereof, and provide this information to the client application 516A. In some embodiments, the stream manager 528 may leverage any suitable virtual camera software, such as the virtual camera feature provided by open broadcasting software (OBS). As a result, even though the AI agent is not a real entity—e.g., a user 530—the client application 516A may receive a video, audio, and/or textual stream representing the AI agent as if generated by any other user device(s) 504. As such, the client application 516A, the client application 516B, and/or the host application 526 may not require knowledge that the AI agent is present—e.g., the AI agent device(s) 502 may be treated by the host device(s) 506 as another user device(s) 504. The AI agent device(s) 502—and the features and functionality thereof—may be applied to any conversational AI platform without a requirement for an API corresponding to the AI agent, because the communication of the client application 516 with one or more existing APIs of the host application 526 may be enough to implement the AI agent.

The host device(s) 506 may then analyze, process, transmit, and/or forward the video, audio, and/or textual streams corresponding to the AI agent to the user device(s) 504, and the client application 516B may cause presentation of the data via the display and/or output of the data (e.g., audio data) via the I/O component(s) 520.

This process may continue during times when the AI agent is to be displayed or presented—e.g., the entire time, only after activation criteria are satisfied and until a given interaction is complete, the remainder of the time after activation criteria are satisfied, until the AI agent is asked to leave or removed from the conference, etc.

Example Computing Device

Figure 6:
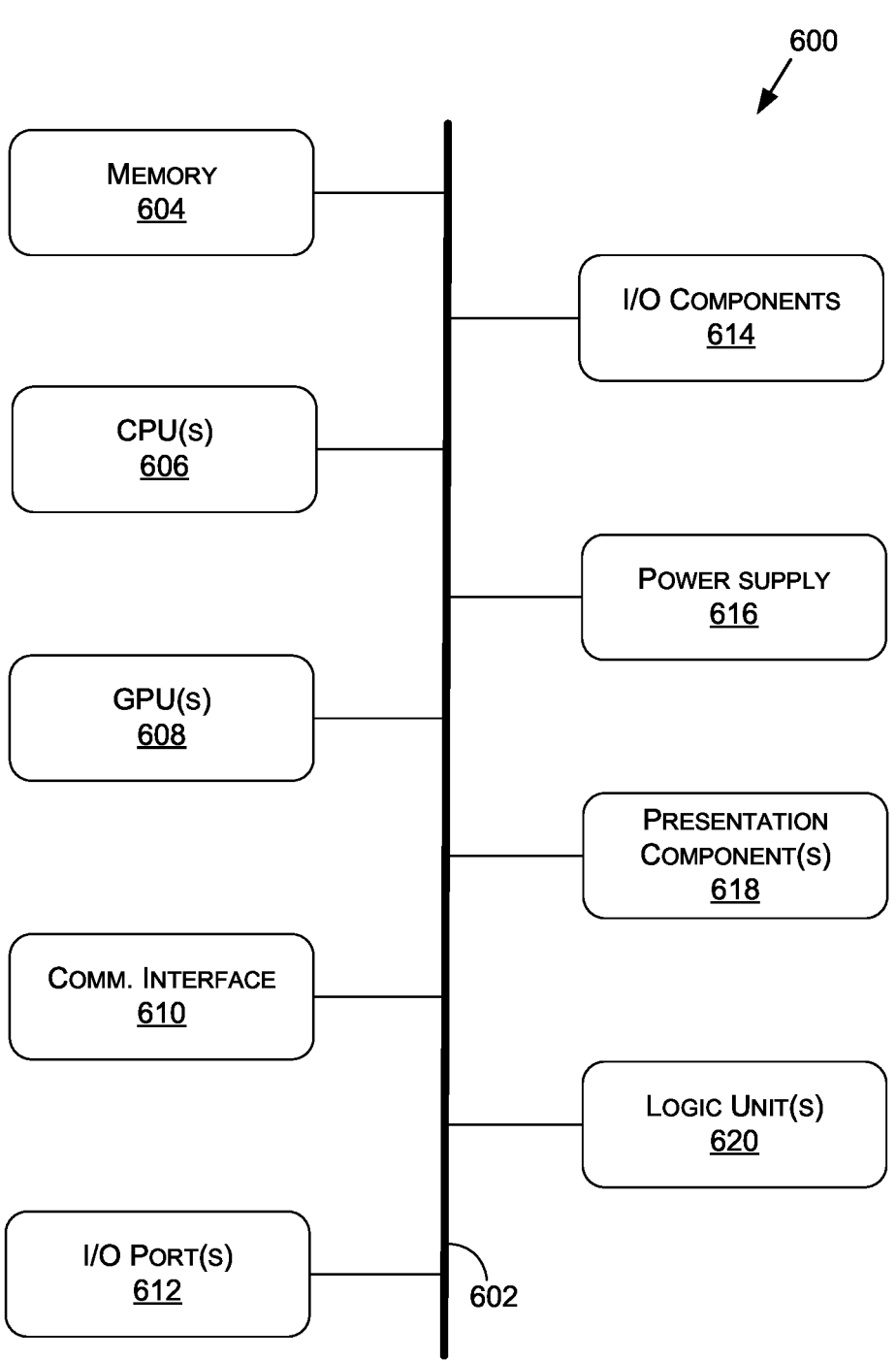
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and nonremovable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIM), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that allow the computing device 600 to communicate with other computing devices via an electronic communication network, included wired and/or wireless communications. The communication interface 610 may include components and functionality to allow communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may allow the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that allow detection of motion. In some examples, the output of the accelerometers or gyroscopes may be used by the computing device 600 to render immersive augmented reality or virtual reality.

The power supply 616 may include a hard-wired power supply, a battery power supply, or a combination thereof.

The power supply 616 may provide power to the computing device 600 to allow the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Example Data Center

Figure 7:
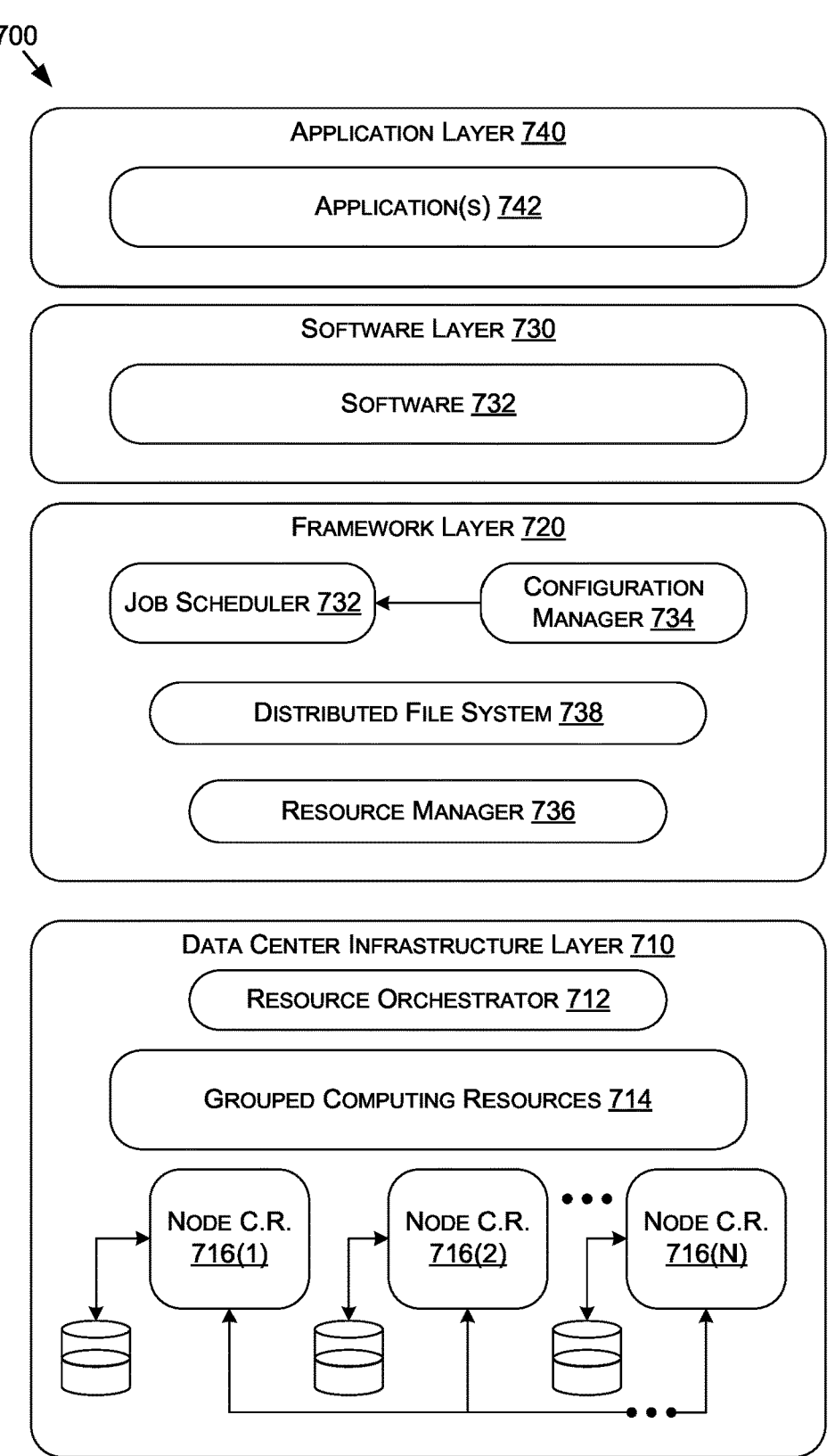
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 732, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may use distributed file system 738 for large-scale data processing (e.g., "big data"). In at least one embodiment, job scheduler 732 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 732. In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. At least one processor comprising:
one or more circuits to:
  obtain input data from a device, the input data representative of a query to a conversational artificial intelligence (AI) application;
  determine, using one or more classifier models, one or more classes of one or more slots associated with the query and an intent expressed in the query, the intent representing a user requested instruction to retrieve one or more slot values that a user previously requested be stored for the one or more slots;
  based at least on the intent and the one or more classes indicating that data representing the one or more slot values is included in at least one of one or more transcripts or one or more logs of user interactions stored in at least one unstructured data structure, cause a search for the one or more slot values in a structured data structure of slot values derived from the user interactions stored in the at least one unstructured data structure; and
  generate a response to the query that includes the one or more slot values.

2. The at least one processor of claim 1, wherein the at least one unstructured data structure comprises a document associated with the user, the document being populated based at least on one or more prior interactions between the user and the conversational AI application including the user requesting that the one or more slot values be stored for the one or more slots.

3. The at least one processor of claim 1, wherein the slot values in the structured data structure include key-value pairs extracted from the at least one unstructured data structure, a key of the key-value pairs represents a class of the one or more classes and a value for the key represents a slot value of the one or more slot values, and the search includes retrieving, using the class, the slot value using the class as the key.

4. The at least one processor of claim 1, wherein the one or more circuits are to determine, using the intent and the one or more classes, whether the query is a personalization query or a non-personalization query, wherein the search is caused based at least on the determination being that the query is the personalization query.

5. The at least one processor of claim 1, the structured data structure includes short term memory of the conversational AI application, the at least one unstructured data structure includes long term memory of the conversational AI application, and the one or more circuits are to, based at least on the intent, store the one or more slot values in the short term memory.

6. The at least one processor of claim 1, wherein the data representing the one or more slot values were stored in the at least one unstructured data structure based at least on the user previously requesting the one or more slot values to be stored for the one or more slots.

7. The at least one processor of claim 1, wherein the one or more classifier models include a classifier that is trained to jointly classify the intent of the query and the one or more classes of the one or more slots.

8. The at least one processor of claim 1, wherein the conversational AI application is at least one of a conversation AI platform, an in-cabin application of a vehicle, a food or beverage ordering application, a computer aided design (CAD) application, a customer service application, a web service application, a smart speaker or smart display application, a retail application, a financial application, or a food service application.

9. The at least one processor of claim 1, wherein the at least one processor is comprised in at least one of:
  a control system for an autonomous or semi-autonomous machine;
  a perception system for an autonomous or semi-autonomous machine;
  a system for performing simulation operations;
  a system for performing deep learning operations;
  a system implemented using an edge device;
  a system implemented using a robot;
  a system incorporating one or more virtual machines (VMs);
  a system implemented at least partially in a data center;
  a system including a collaborative creation platform for three-dimensional (3D) content; or
  a system implemented at least partially using cloud computing resources.

10. A system comprising:
one or more processing units comprising processing circuitry to:
  receive a query directed to a conversational artificial intelligence (AI) platform;
  determine, using one or more classifier models, a tag associated with one or more slots of the query, and an intent expressed in the query, the intent representing a user requested instruction to retrieve one or more slot values that a user previously requested be stored for the one or more slots;
  determine, in response to the query and based at least on the intent and the tag indicating that data representing the one or more slot values is included in at least one of one or more transcripts or one or more logs of user interactions stored in at least one unstructured data structure, that the one or more slot values are stored in a structured data structure of slot values derived from the user interactions stored in the at least one unstructured data structure;
  obtain, based at least on the determination that the one or more slot values are stored in the structured data structure, the one or more slot values from the structured data structure; and
  generate a response to the query that includes the one or more slot values.

11. The system of claim 10, wherein the processing circuitry is further to determine whether to store data representing the query and the response in the at least one unstructured data structure based at least on the intent.

12. The system of claim 10, wherein the one or more slot values are derived from the at least one unstructured data structure based at least on one or more confidence values associated with the one or more slot values.

13. The system of claim 10, wherein the tag is determined by a classifier of the one or more classifier models that is trained to classify a slot of the one or more slots with a class that represents a type of relationship between the slot and the user.

14. The system of claim 10, wherein the system is comprised in at least one of:
  a control system for an autonomous or semi-autonomous machine;
  a perception system for an autonomous or semi-autonomous machine;

a system for performing simulation operations;

a system for performing deep learning operations;

a system implemented using an edge device;

a system implemented using a robot;

a system incorporating one or more virtual machines (VMs);

a system implemented at least partially in a data center;

a system including a collaborative creation platform for three-dimensional (3D) content; or a system implemented at least partially using cloud computing resources.

15. A method comprising:

storing data representing slot values included in queries between a user and a conversational artificial intelligence (AI) agent in at least one unstructured data structure based at least on determining the queries express user requested instructions to store the slot values for slots;

determining, in response to a query directed to the conversational AI agent and using one or more classifiers, one or more classes of one or more slots associated with the query and an intent expressed in the query, the intent representing a user requested instruction to retrieve one or more slot values for the one or more slots from the data;

based at least on the intent and the one or more classes indicating that the data representing the one or more slot values is included in at least one of one or more transcripts or one or more logs of user interactions stored in the at least one unstructured data structure, causing a search for the one or more slot values in a structured data structure of the slot values derived from the user interactions stored in the at least one unstructured data structure; and generating a response to the query that includes the one or more slot values.

16. The method of claim 15, wherein the method further comprises determining domain information associated with the query based at least on the at least one unstructured data structure.

17. The method of claim 15, wherein the user interactions correspond to at least one of video, audio, or text generated by at least one of a camera, a microphone, or an input device of a user device.

18. The method of claim 15, wherein the structured data structure comprises a JavaScript Object Notation (JSON) data object.

19. The method of claim 15, wherein the at least one unstructured data structure comprises a document including a set of interactions between the user and the conversational AI agent.

20. The method of claim 15, wherein the query corresponds to a plurality of domains.

* * * * *